United States Patent
Mahaffey

(10) Patent No.: US 10,660,319 B2
(45) Date of Patent: May 26, 2020

(54) BAIT HOLDER

(71) Applicant: Michael Mahaffey, Cuero, TX (US)

(72) Inventor: Michael Mahaffey, Cuero, TX (US)

( * ) Notice: Subject to any disclaimer, the term of this patent is extended or adjusted under 35 U.S.C. 154(b) by 183 days.

(21) Appl. No.: 15/837,021

(22) Filed: Dec. 11, 2017

(65) Prior Publication Data

US 2019/0174732 A1   Jun. 13, 2019

(51) Int. Cl.
*A01K 83/06* (2006.01)
*A01K 91/14* (2006.01)
*A01K 91/06* (2006.01)

(52) U.S. Cl.
CPC .............. *A01K 83/06* (2013.01); *A01K 91/06* (2013.01); *A01K 91/14* (2013.01)

(58) Field of Classification Search
CPC ..................................................... A01K 83/06
See application file for complete search history.

(56) References Cited

U.S. PATENT DOCUMENTS

| | | | | | |
|---|---|---|---|---|---|
| 2,588,526 A | * | 3/1952 | Hoage | ..................... | A01K 83/06 43/44.6 |
| 3,105,319 A | * | 10/1963 | Whalen | .................. | A01K 83/06 43/44.4 |
| 3,200,532 A | * | 8/1965 | Walton | .................... | A01K 83/06 43/44.6 |
| 3,289,346 A | * | 12/1966 | Ehling | .................... | A01K 83/06 43/44.6 |
| 3,415,004 A | * | 12/1968 | Whalen | .................. | A01K 83/06 43/42.74 |
| 3,541,719 A | * | 11/1970 | Temple | .................. | A01K 83/06 43/44.4 |
| 4,221,069 A | * | 9/1980 | Esses | ...................... | A01K 83/06 43/41 |
| 6,050,023 A | * | 4/2000 | Newell | .................. | A01K 83/06 43/44.2 |
| 6,895,710 B2 | * | 5/2005 | Hanson | .................. | A01K 85/00 43/4.5 |

* cited by examiner

*Primary Examiner* — Richard G Davis
(74) *Attorney, Agent, or Firm* — The Iwashko Law Firm, PLLC; Lev Ivan Gabriel Iwashko

(57) ABSTRACT

A bait holder to promote humane treatment of live bait having a plurality of ribs that extended from a spring and at least one clip at least one leader connected to a fish line and a hook. The spring may be longer for better hook placement. The leader maybe hollow for buoyancy so the bait stays alive causing better results. At least one attachment sight is connected to the leader. At least one hook attachment is connected to the leader. The number of ribs is reduced or increased directly proportional to the size and kind of the bait.

2 Claims, 1 Drawing Sheet

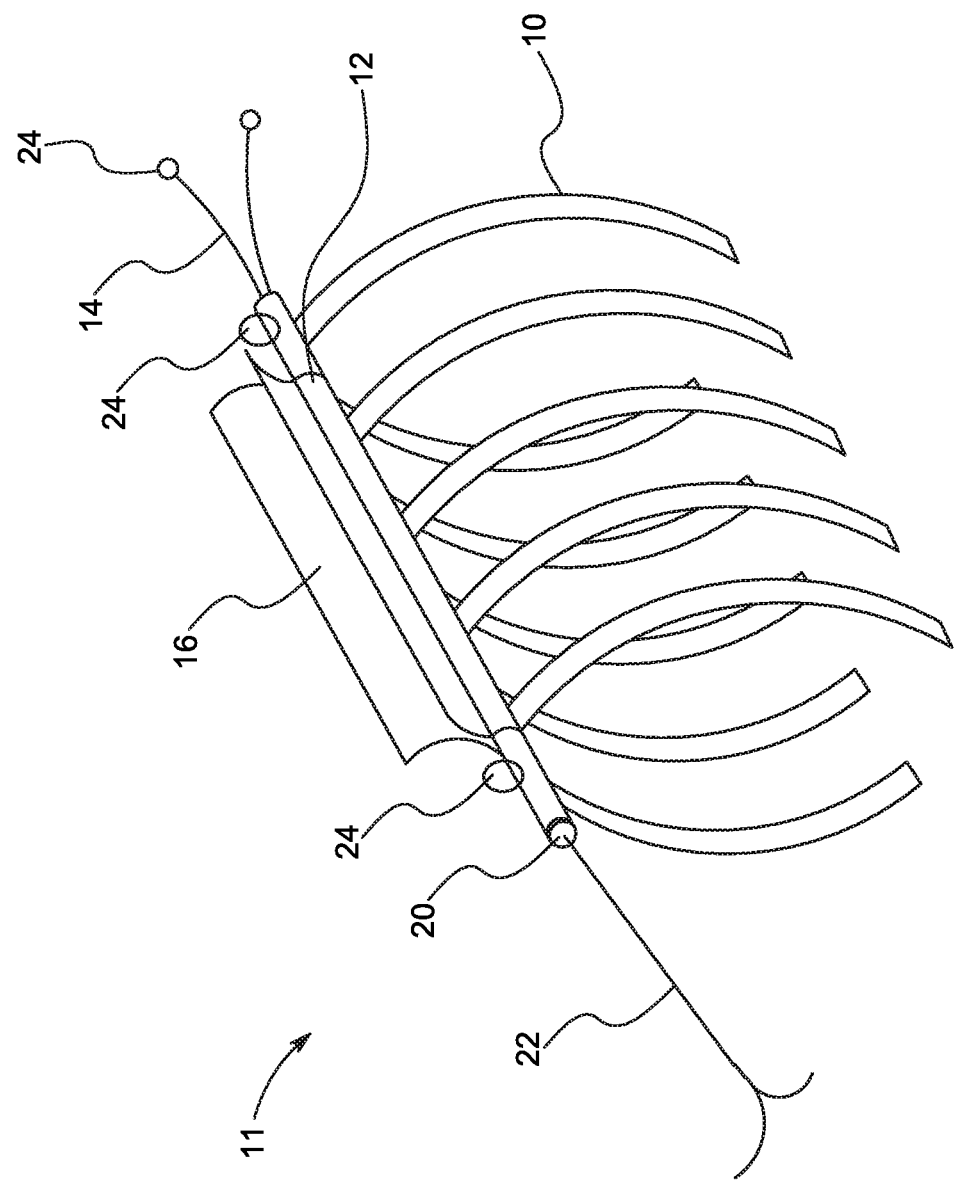

BAIT HOLDER

BACKGROUND OF THE INVENTION

Field of the Invention

The present invention is generally in the sport fishing industry. More specifically, the present invention is a device to hold bait.

Background of the Invention

The present invention has ribs, spring, leaders and clips. The main purpose of the present invention is to provide a novel alternative to traditional baiting methods. Using bait for fishing is a common practice, as it attracts fish and increases the chances of reeling in a catch. However, to utilize bait one must pierce the bait through a hook, which can be seen as inhumane when working with live bait as well as causing individuals to be susceptible to puncture wounds. Ingenious and practical, the present invention introduces a revolutionizing device able to hold bait without the need of perforations, leaving bait virtually unharmed and avoiding hand injuries. Comprised of various ribs that serve as a holding vessel for bait; the present invention features a grip which one can squeeze to manually open and close the device. The present invention is modeled to fit both synthetic and live bait, empowering consumers to effortlessly insert their preferred bait without concerns of the bait falling through. The present invention is additionally buoyant, keeping the bait held closely to the surface in order to prevent accidental snags onto debris found within salt or fresh waters. The present invention can easily become an essential fishing accessory, making it possible to be readily available at sporting goods stores and/or online retailers.

The present invention is the only product of its kind to promote humane treatment of live bait by removing the need of punctures by granting a more efficient and functional method. The present invention is uniquely designed to withstand both fresh water as well as salt waters, granting a versatile product that enables users to fish at all of their favorite locations without concerns of wear. The present invention keeps the bait on the hook longer. The present invention will make the bait look crippled to help lure in fish. By not piercing the bait with a hook the present invention will extend the life of the bait which will save money.

BRIEF DESCRIPTION OF THE DRAWINGS

The present invention will be described by way of exemplary embodiments, but not limitations, illustrated in the accompanying drawings in which like references denote similar elements, and in which:

FIG. 1 illustrates a side view of a bait holder, in accordance with one embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

As shown in FIG. 1 of the present invention bait holder 11 has ribs 10 extend from spring 16 and clips 12. Leaders 20, 14 are shown at the rear and front of spring 16 and clips 12. The spring 16 portion may remain longer for better hook placement. Leaders 14 portion may be hollow for buoyancy so the bait stays alive causing better results. Attachment sites 24 and a hook attachment 22 are shown. The number of ribs 10 is reduced or increased directly proportional to the size and kind of the bait. At least one attachment site 24 is connected to at least one leader 20 or 14. The leader 20 or 14 is connected to a hook attachment 22 so that if the bait holder 11 is destroyed the catch would not be lost. Ribs 10 may have a rough or rubber surface to better hold the bait.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

What is claimed is:

1. A bait holder to promote humane treatment of live bait, comprising:
    a pair of complementary clips joined at a hinge and forming a grip,
        an arcuate portion extending from each clip, each arcuate portion of each clip comprising a plurality of rectangular ribs;
    each of said ribs comprising one of a rough surface or a rubber surface;
    a spring aligned along said hinge, said spring urging the arcuate portions to converge;
    at least one leader extending from each end of said spring;
    at least one attachment connected to a first portion of each leader disposed on said spring to receive an attachment thereto; and
    a hook attachment connected to a second portion of the at least one leader to extend away from the at least one leader to receive a hook,
    wherein the grip portions being pressed together, the arcuate portions open allowing bait to be placed therebetween, and the grip being released, the spring maintaining the arcuate portions in a closed position, thus retaining bait between the arcuate portions without the bait being impaled.

2. The bait holder according to claim 1, wherein the leader is hollow for buoyancy so the bait stays alive causing better results.

* * * * *